HENRY B. LARZELERE.
Improvement in Horse-Powers.
No. 127,072.                        Patented May 21, 1872.
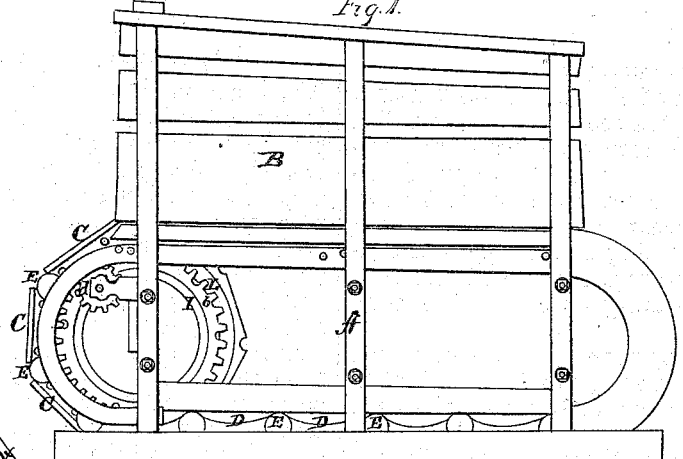
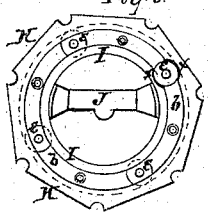
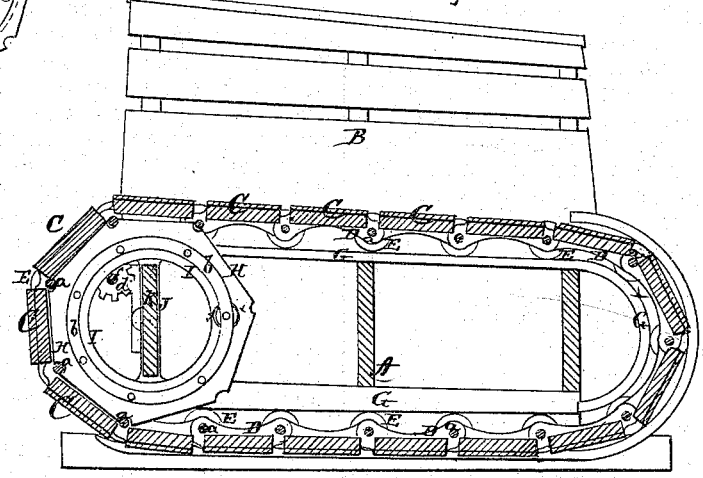
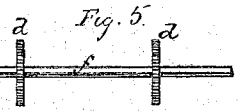
Witnesses:                        Inventor
James E. Hutchinson          Henry B. Larzelere
C. L. Evert                     per
                                        Alexander Mason
                                                 Attorneys.

127,072

UNITED STATES PATENT OFFICE.

HENRY B. LARZELERE, OF DOYLESTOWN, PENNSYLVANIA, ASSIGNOR TO HIMSELF AND DANIEL HULSHIZER, JR., OF SAME PLACE.

IMPROVEMENT IN HORSE-POWERS.

Specification forming part of Letters Patent No. 127,072, dated May 21, 1872.

*To all whom it may concern:*

Be it known that I, HENRY B. LARZELERE, of Doylestown, in the county of Bucks and in the State of Pennsylvania, have invented certain new and useful Improvements in Horse-Powers; and do hereby declare that the following is a full, clear, and exact description thereof, reference being had to the accompanying drawing and to the letters of reference marked thereon making a part of this specification.

The nature of my invention consists in the construction and arrangement of a "horse-power," as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a longitudinal vertical section of my machine. Fig. 3 is an inside view, and Fig. 4 a cross-section of one of the cylinder-heads. Fig. 5 is a view of the shaft communicating motion from the power to the machine to be driven.

A represents the frame, in the upper portion of which is formed the stall B for the horse. The bottom of this stall, and upon which the horse works, is formed of slats C C, attached and connecting two endless chains, which are composed of short bars or links D D, pivoted together by means of rods $a\ a$, said rods passing across and pivoting the corresponding bars or links of the other chain. Upon the ends of the rods $a\ a$ are rollers E E, which move upon a track or ways, G G, arranged as shown in Fig. 2. The endless chains D D, at the upper end of the stall, pass over two notched polygonal-shaped wheels, H H, one on each side of the machine, the rods $a\ a$ of the chains catching in the notches on said wheels, and thereby turning them. The wheel H has a groove around its inner circumference for the reception of any suitable number of friction-rollers, $e\ e$, the journals of which are placed in two rings, $b\ b$, as shown in Fig. 4. I represents a ring or wheel of suitable dimensions, provided with a groove around its outer circumference. It has also an angular bar, J, across the center, which bar is secured to one side of the frame A on the inside. A similar wheel and bar being secured on the opposite side, and the two bars connected by a central board or bar, K, a stationary skeleton-drum is formed, around which the wheels H H and endless chains D D are to move. One of the wheels H, with its friction-rollers and rings, is put on each of the rings I in such a manner that the rollers $e\ e$ will move in the circumferential groove on said ring or wheel I. This should be done before the ring I is secured in place on the frame in the following manner: The wheels H and I are held in place, one within the other, with one of the rings $b$ between them, as shown in Fig. 3. These wheels have notches $x\ x$, which are brought opposite each other, and one roller, $e$, dropped down through or between the same, so that its journal enters a hole in the ring $b$. This ring, with the roller, is then turned till the next roller-journal hole gets between the notches $x\ x$, when the next roller is put in, and so on until they are all in place, when the other ring, $b$, is put on, the upper journals of the rollers entering holes in the same, and the two rings screwed together, thus securing the rollers $e\ e$ in the grooved wheel I, and the groove-wheel H on the rollers preventing them from coming apart, and at the same time allowing the rollers to move on the wheel I and the wheel H to move on the rollers, the rollers being maintained at their proper distances apart by the rings $b\ b$. To the outer side of each wheel H is attached or formed upon it a wheel, L, with cogs around its entire inner circumference, and the two cog-wheels L L mesh with two pinions, $d\ d$, upon the same shaft $f$, from which motion is communicated to any machinery desired to be driven. The machine is of course so arranged that the bottom of the stall will be on an incline downward toward the rear.

Having thus fully described my invention, what I claim as new, and desire to secure by Letters Patent, is—

1. The combination of the skeleton-drum, consisting of the grooved wheels I, cross-bars J, board K, rollers *e e*, rings *b b*, wheel H with interior groove, and outer wheel L, all substantially as and for the purposes set forth.

2. The combination of the frame A with ways G G, stall B, endless chains D, rods *a*, rollers E, slats C, skeleton drum I J K, rollers *e*, rings *b*, and wheels H L, all constructed and arranged substantially as and for the purposes herein set forth.

In testimony that I claim the foregoing I have hereunto set my hand this 28th day of February, 1872.

HENRY B. LARZELERE.

Witnesses:
 EDM. F. BROWN,
 C. L. EVERT.